United States Patent
Marin et al.

(10) Patent No.: US 10,556,367 B2
(45) Date of Patent: Feb. 11, 2020

(54) COMPOSITE BLADE COMPRISING A PLATFORM EQUIPPED WITH A STIFFENER

(71) Applicant: SAFRAN AIRCRAFT ENGINES, Paris (FR)

(72) Inventors: Sébastien Marin, Moissy-Cramayel (FR); Thomas Alain De Gaillard, Moissy-Cramayel (FR); Audrey Laguerre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 333 days.

(21) Appl. No.: 15/522,848

(22) PCT Filed: Oct. 28, 2015

(86) PCT No.: PCT/FR2015/052898
§ 371 (c)(1),
(2) Date: Apr. 28, 2017

(87) PCT Pub. No.: WO2016/066954
PCT Pub. Date: May 6, 2016

(65) Prior Publication Data
US 2017/0326757 A1     Nov. 16, 2017

Related U.S. Application Data

(60) Provisional application No. 62/072,632, filed on Oct. 30, 2014.

(30) Foreign Application Priority Data

Jun. 3, 2015 (FR) ..................... 15 55064

(51) Int. Cl.
*B29B 11/16* (2006.01)
*F01D 5/28* (2006.01)
(Continued)

(52) U.S. Cl.
CPC ............ *B29B 11/16* (2013.01); *B29C 70/222* (2013.01); *B29D 99/0025* (2013.01);
(Continued)

(58) Field of Classification Search
None
See application file for complete search history.

(56) References Cited

U.S. PATENT DOCUMENTS

| 4,580,946 A | 4/1986 | Bobo | |
|---|---|---|---|
| 5,080,142 A * | 1/1992 | Calamito | ............... D03D 11/02 |
| | | | 139/384 R |

(Continued)

FOREIGN PATENT DOCUMENTS

| JP | S 61-142304 A | 12/1987 |
|---|---|---|
| JP | 2003-020995 A | 1/2003 |

(Continued)

OTHER PUBLICATIONS

International Search Report in corresponding International Application No. PCT/FR2015/052898, dated Mar. 2, 2016 (4 pages—including English translation).

(Continued)

*Primary Examiner* — David E Sosnowski
*Assistant Examiner* — Theodore C Ribadeneyra
(74) *Attorney, Agent, or Firm* — Bookoff McAndrews, PLLC

(57) ABSTRACT

A fiber preform for a turbine engine blade and also a single-piece blade suitable for being formed using such a preform, a rotor wheel, and a turbine engine including such a blade, the fiber preform being obtained by three-dimensional weaving and comprising a first longitudinal segment suitable for forming a blade root (21), a second longitudinal segment extending the first longitudinal segment upwards and suitable for forming an airfoil portion (22), a first (Continued)

transverse segment extending transversely from the junction between the first and second longitudinal segments and suitable for forming a first platform (23), and a first stiffener strip extending downwards from the distal edge of the first transverse portion and suitable for forming a first platform stiffener (25).

15 Claims, 3 Drawing Sheets

(51) Int. Cl.
*B29C 70/22* (2006.01)
*B29D 99/00* (2010.01)
*D03D 25/00* (2006.01)
*F01D 5/34* (2006.01)
*B29L 31/08* (2006.01)

(52) U.S. Cl.
CPC ........... *D03D 25/005* (2013.01); *F01D 5/282* (2013.01); *F01D 5/34* (2013.01); *B29L 2031/08* (2013.01); *F05D 2220/32* (2013.01); *F05D 2230/20* (2013.01); *F05D 2300/603* (2013.01); *F05D 2300/6012* (2013.01)

(56) References Cited

U.S. PATENT DOCUMENTS

| | | | | |
|---|---|---|---|---|
| 5,143,517 | A * | 9/1992 | Vermont | F01D 5/22 416/190 |
| 5,271,718 | A | 12/1993 | Mitchell, Jr. et al. | |
| 5,358,758 | A * | 10/1994 | Skelton | B29C 70/222 428/53 |
| 5,573,377 | A * | 11/1996 | Bond | F01D 5/147 416/219 R |
| 5,791,877 | A * | 8/1998 | Stenneler | F01D 5/22 416/204 A |
| 6,676,373 | B2 * | 1/2004 | Marlin | B29C 70/34 29/889.71 |
| 7,093,359 | B2 * | 8/2006 | Morrison | F01D 5/282 264/257 |
| 7,101,154 | B2 * | 9/2006 | Dambrine | B29C 70/48 29/889.71 |
| 7,510,379 | B2 * | 3/2009 | Marusko | F01D 5/282 29/889.7 |
| 7,628,587 | B2 * | 12/2009 | McFeat | F01D 5/141 416/189 |
| 8,540,488 | B2 * | 9/2013 | Marra | F01D 5/26 416/190 |
| 9,017,033 | B2 * | 4/2015 | Brown | F01D 5/147 416/193 A |
| 9,212,560 | B2 * | 12/2015 | McCaffrey | F01D 5/147 |
| 9,500,091 | B2 * | 11/2016 | Delapierre | F01D 5/3092 |
| 9,752,443 | B2 * | 9/2017 | Watanabe | C04B 35/80 |
| 2004/0253110 | A1 * | 12/2004 | Crane | F01D 5/14 416/193 A |
| 2007/0280830 | A1 * | 12/2007 | Mulcaire | F01D 11/008 416/193 R |
| 2011/0027098 | A1 * | 2/2011 | Noe | C04B 35/573 416/241 B |
| 2011/0277869 | A1 * | 11/2011 | Coupe | D03D 25/005 139/11 |
| 2012/0034089 | A1 * | 2/2012 | Wadewitz | B29C 70/24 416/223 R |
| 2012/0055609 | A1 * | 3/2012 | Blanchard | B29C 70/24 156/89.11 |
| 2012/0099982 | A1 * | 4/2012 | Coupe | C04B 35/524 415/200 |
| 2012/0244007 | A1 * | 9/2012 | Mason | F04D 29/322 416/235 |
| 2012/0301317 | A1 * | 11/2012 | Alvanos | F01D 5/147 416/241 B |
| 2013/0011271 | A1 * | 1/2013 | Shi | F01D 5/28 416/230 |
| 2013/0089429 | A1 * | 4/2013 | Nunez | C04B 35/571 416/230 |
| 2013/0243604 | A1 * | 9/2013 | Roussille | B29C 70/24 416/241 A |
| 2013/0259699 | A1 * | 10/2013 | Collin | F01D 5/225 416/224 |
| 2014/0030076 | A1 * | 1/2014 | Nunez | F01D 5/282 415/183 |
| 2014/0072436 | A1 * | 3/2014 | Thomen | F01D 5/147 416/219 R |
| 2014/0147264 | A1 * | 5/2014 | Belmonte | F01D 9/042 415/208.2 |
| 2014/0349538 | A1 * | 11/2014 | Marchal | B29C 70/24 442/206 |
| 2014/0356151 | A1 * | 12/2014 | Fremont | F01D 5/282 415/200 |
| 2014/0363299 | A1 * | 12/2014 | Marchal | B29C 70/24 416/193 A |
| 2015/0003978 | A1 * | 1/2015 | Watanabe | F01D 5/282 415/208.1 |
| 2015/0040396 | A1 * | 2/2015 | Fremont | B29B 11/16 29/889.71 |
| 2015/0167209 | A1 * | 6/2015 | Marchal | F01D 9/02 416/230 |
| 2016/0230568 | A1 * | 8/2016 | Sippel | F01D 9/041 |
| 2016/0245103 | A1 * | 8/2016 | Gimat | B29B 11/16 |
| 2017/0058912 | A1 * | 3/2017 | De Gaillard | B29B 11/16 |
| 2017/0198591 | A1 * | 7/2017 | Roussille | F01D 5/282 |
| 2017/0326757 | A1 * | 11/2017 | Marin | F01D 5/284 |
| 2018/0036914 | A1 * | 2/2018 | Marsal | B29D 99/0025 |
| 2018/0135436 | A1 * | 5/2018 | Berdou | B29B 11/16 |
| 2018/0251921 | A1 * | 9/2018 | Shi | D03D 25/005 |
| 2018/0313360 | A1 * | 11/2018 | Avakian | F04D 29/286 |
| 2018/0319101 | A1 * | 11/2018 | Lanfant | B29D 99/0003 |

FOREIGN PATENT DOCUMENTS

WO WO 2013/104852 A2 7/2013
WO 2014076408 A1 5/2014

OTHER PUBLICATIONS

Japanese Office Action in corresponding Japanese Application No. 2017-523342, dated Jul. 23, 2019 (7 pages).

* cited by examiner

COMPOSITE BLADE COMPRISING A PLATFORM EQUIPPED WITH A STIFFENER

CROSS-REFERENCE TO RELATED APPLICATIONS

This application is the U.S. national phase entry under 35 U.S.C. § 371 of International Application No. PCT/FR2015/052898, filed on Oct. 28, 2015, which claims priority to French Patent Application No. 1555064, filed on Jun. 3, 2015, and to U.S. Application No. 62/072,632, filed on Oct. 30, 2014, the entireties of which are herein incorporated by reference.

FIELD OF THE INVENTION

The present description relates to a fiber preform for a turbine engine blade and also to a single-piece blade capable of being made from such a preform, to a rotor wheel, and to a turbine engine including such a blade.

Such a preform may be used for making single-piece blades including aerodynamic platforms in which centrifugal deformation is controlled. Such blades may in particular be fan blades for an airplane turbojet, to mention but one example.

BACKGROUND

In order to reduce the weight of airplane turbojets, and thus to reduce the fuel consumption of such turbojets, it is already known to fabricate certain blades of jets out of composite material, which is much lighter than the metal that has conventionally been used heretofore.

For this purpose, it is nowadays also known to use three-dimensional (3D) weaving techniques in order to obtain fiber preforms that lead to composite blades of very good quality. In particular, Document WO 2014/076408 describes a method of weaving a airfoil preform that makes it possible to obtain blades in single-piece manner that include both pressure side and suction side platforms, which platforms are of constant thickness.

Nevertheless, during tests and simulations undertaken on such blades, the inventors have found that various zones of the platforms deform to a greater or lesser extent under the effect of the centrifugal forces that act while the turbine engine is in operation. In particular, the inventors have observed that the deformation of a zone of the platform increases with increasing offset from the airfoil.

Under such circumstances, when in operation, those platforms present irregularities of shape that might disturb the stream of air and thus the efficiency of the turbine engine. In addition, the inventors have observed that suction side platforms, which are generally the longer platforms, are subjected to greater bending than pressure side platforms, such that discontinuities appear at the interface between the suction side and pressure side platforms of two consecutive blades, there also being a risk of the pressure side platforms being overlapped by the adjacent suction side platforms.

There therefore exists a real need for a fiber preform, a blade, a rotor wheel, and a turbine engine that are free, at least in part, of the above-mentioned drawbacks inherent to known systems.

SUMMARY

The present description relates to a fiber preform for a turbine engine blade obtained by three-dimensional weaving, the preform comprising a first longitudinal segment suitable for forming a blade root, a second longitudinal segment extending the first longitudinal segment upwards and suitable for forming an airfoil portion, a first transverse segment extending transversely from the junction between the first and second longitudinal segments and suitable for forming a first platform, and a first stiffener strip extending downwards from the distal edge of the first transverse portion and suitable for forming a first platform stiffener.

In the present description, the terms "longitudinal", "transverse", "bottom", "top", and their derivatives are defined relative to the main direction of the blade under consideration, the blade root being situated at the bottom end of the blade in this frame of reference; the terms "axial", "radial", "tangential", "inner", "outer", and their derivatives are defined relative to the main axis of the rotor wheel carrying the blades, i.e. in general the axis of the turbine engine. The term "axial plane" is used to mean a plane containing the main axis of the turbine engine, and the term "radial plane" a plane perpendicular to the main axis; the term "longitudinal plane" is used to mean a plane parallel to the main direction of the blade and perpendicular to the direction in which the blade root extends: such a longitudinal plane is thus a radial plane in the reference frame of the turbine engine. In addition, the terms "upstream" and "downstream" are defined relative to the flow of air through the turbine engine.

By means of such a preform, it is possible to obtain a single-piece blade comprising a blade root, an airfoil portion, and at least one platform having a stiffener that ensures more regular deformation of the platform under the effect of centrifugal force while the turbine engine is in operation.

The presence of this stiffener strip, which extends substantially radially, serves to link and strengthen the various zones of the platform, particularly in the distal zones of the platform, thereby tending to ensure that deformations at the end of the platform are more uniform. The deformations of the platform are thus, so to speak, averaged, with the zones that are usually strongly deflected pulling the zones that are usually less deflected in an outward direction, while the zones that are less deflected serve to hold inwardly the zones that are subjected to high levels of centrifugal force. Under such circumstances, in operation, the platform retains a profile that is relatively regular, and disturbs the flow of the air stream little or not at all.

By means of this preform, it is thus possible to benefit from the advantages of a 3D woven single-piece blade (saving in weight; smaller number of parts; simplified assembly and maintenance; etc.) while ensuring that the air stream is aerodynamically regular.

Furthermore, in the event of a violent impact, e.g. as a result of ingesting a bird, such stiffeners form abutments that prevent a platform from overlapping the platform of a neighboring blade.

In certain embodiments, the first stiffener strip is of varying width. In this way, it is possible to take account of the shape of the platform in order to compensate for the deformations of the platform in more optimized manner. In particular, a varying width makes it possible firstly to adjust the stiffness of the stiffener strip, and thereby adjust the transmission of forces from one zone of the platform to another, and secondly to adjust the weight that is added locally to the platform and thus to adjust locally the centrifugal forces that are exerted on the platform. In particular, by locally adding weight to a zone of the platform that is usually less deflected, the magnitude of the centrifugal force in that zone is increased such that it is deflected a little more and comes more easily into alignment with neighboring zones that are naturally deflected to a greater extent.

In certain embodiments, the first stiffener strip extends all along the distal edge of the first transverse segment. In this way, control is exercised over centrifugal forces all along the platform.

In certain embodiments, the first stiffener strip is of minimum width where the width of the first transverse segment is at a maximum, i.e. in the longitudinal plane where its width is at a maximum. The inventors have found the greater the width of the platform (and thus of the first transverse segment), the greater the extent to which the zone in question of the platform is subjected to radial deformation. This can be explained by the fact that the longer the platform, the greater the bending moment exerted by centrifugal force on the distal portion of the zone in question, since the lever arm connecting this distal portion to the zone where the platform is connected to the blade root is longer. Under such circumstances, in such embodiments, only a little weight is added in this zone that is naturally strongly deflected so that its radial deformation in operation is worsened little or not at all.

In certain embodiments, the first stiffener strip is of maximum width where the width of the first transverse segment is at a minimum, or more precisely in the longitudinal plane where its width is at a minimum. In this way, greater weight is added in the zone that is naturally deflected little, such that this zone presents greater radial deformation in operation and therefore comes more easily into alignment with the neighboring zones that are naturally deflected to a greater extent.

In certain embodiments, on going along the distal edge of the first transverse segment, the width of the first stiffener strip both increases while the width of the first transverse segment decreases, and also decreases while the width of the first transverse segment increases. In this way, the weight and the stiffness of the stiffener strip are adjusted all along the platform as a function of its shape: this thus achieves platform deformation in operation that is more regular all along its length.

In certain embodiments, the width of the first stiffener strip in a given longitudinal plane is inversely proportional to the width of the first transverse segment in said longitudinal plane. The inventors have observed that this relationship ensures very good regularity in the deformation of the platform and thus gives rise to a significant reduction in the aerodynamic distortion to which the air stream is subjected.

In certain embodiments, the first stiffener strip has a constant number of layers of yarns. Its thickness may thus be constant.

In certain embodiments, the first stiffener strip has the same number of layers of yarns as the first transverse segment. The layers of yarns forming the first stiffener strip preferably come from the layers of yarns forming the first transverse segment. Under such circumstances, the thickness of the first stiffener strip is identical to the thickness of the first transverse segment.

In other embodiments, the thickness of the first stiffener strip (or the stiffener derived therefrom) is less than or greater than the thickness of the first transverse segment (or the platform from which it stems). In particular, the thickness of the first stiffener strip (or of the stiffener derived therefrom) may vary along its main direction.

In certain embodiments, on going along the distal edge of the first transverse segment, the weight of a segment of given length of the first stiffener strip increases while the width of the first transverse segment decreases, and decreases while the width of the first transverse segment increases.

In certain embodiments, the weight of a given segment of the first stiffener strip is inversely proportional to the length of the first stiffener strip in the longitudinal transverse plane containing the segment.

In certain embodiments, the first stiffener strip forms an angle with the first transverse segment, the angle lying in the range 60° to 89°, and preferably in the range 75° to 85°. In this way, when two blades are mounted consecutively on the same rotor wheel, with a certain angle of inclination relative to each other, their platforms may be arranged contiguously, with their stiffeners being pressed one against the other, ignoring operating clearance if any, all along a contact surface of large area that further assists in reducing radial deformation. Conversely, it may be observed that with a configuration of 90°, the stiffeners of two consecutive platforms hinder each other, putting the platforms under stress and providing only a line of contact between the stiffeners, thereby greatly disturbing the mechanical behavior of the platforms.

In certain embodiments, the preform includes a second transverse segment extending transversely from the junction between the first and second longitudinal segments in line with and away from the first transverse segment, and suitable for forming a second platform, and a second stiffener strip extending downwards from the distal edge of the second transverse segment, suitable for forming a second platform stiffener. It is thus possible to obtain a single-piece blade having both a pressure side platform and a suction side platform, each of them being provided with a respective stiffener.

It will naturally be understood that all of the characteristics mentioned above on this topic for the first stiffener strip and/or for the first transverse segment may be transposed to the second stiffener strip or the second transverse segment, respectively.

In certain embodiments, the first stiffener strip suitable for forming the stiffener of the suction side platform is of width that is greater in its middle zone than at its upstream and downstream ends. This characteristic complies with the above-explained balancing logic, given that the suction side platform is generally wider at its ends than in its middle.

In certain embodiments, the second stiffener strip suitable for forming the stiffener of the pressure side platform is of width that is smaller in its middle zone than at its upstream and downstream ends. This characteristic complies with the above-explained balancing logic, since the pressure side platform is generally wider in its middle than at its ends.

In certain embodiments, the yarns used for weaving the preform are made of carbon fibers. Nevertheless, it is possible to use yarns of any other type, e.g. made of glass fibers or of Kevlar.

In certain embodiments, the weave used for three-dimensional weaving of the preform may be a 3D interlock type weave. Nevertheless, the outer surfaces of the preform may be woven in essentially two-dimensional (2D) manner, e.g. using a satin type weave.

The present description also relates to a turbine engine blade comprising a blade root, and an airfoil portion extending upwards from the blade root, a platform extending transversely from the airfoil at the junction between the blade root and the airfoil portion, and a stiffener in the form of a strip extending downwardly along the distal edge of the platform. It can be understood that this blade corresponds to the blade that can be obtained using the above-described preform. Nevertheless, such a blade provided with such a stiffener could equally well be obtained using some other method that does not make use of 3D weaving, or it could be made using some other material that is not a composite material: the blade could for example be made out of metal and be obtained by casting.

Under such circumstances, all of the characteristics and advantages of the stiffener strip as described above can be transposed directly to the stiffener, regardless of the material from which it is made or the technique used for obtaining it. In particular, its width may vary; it may extend all along the platform; its width may vary along the edge of the platform as a function of the width of the platform, and in particular in a manner that is inversely proportional to the width of the platform; it may form an angle other than 90° relative to the platform, etc.

In certain embodiments, the blade is made as a single piece out of composite material by means of a fiber preform in accordance with any preceding embodiment, said preform having been shaped in a mold and embedded in a matrix.

In certain embodiments, the matrix is of organic type. In particular it may be made of epoxy resin.

In other embodiments, the matrix is of ceramic type.

In other embodiments, the blade is made of metal material, preferably as a single piece, e.g. by casting.

The present description also provides a bladed wheel for a turbine engine, the wheel comprising a plurality of blades in accordance with any above-described embodiment.

Preferably, it may be a rotor wheel in which the blades are arranged angularly around a rotary hub. Nevertheless, it may also be a stator wheel in which the blades (in such a case, stator vanes) are arranged angularly within a stationary shroud.

The present description also relates to a turbine engine including at least one blade or at least one bladed wheel in accordance with any of the above embodiments.

The above-mentioned characteristics and advantages, and others, appear on reading the following detailed description of embodiments of the preform, of the blade, of the intermediate casing, and of the turbine engine that are proposed. This detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs.

DETAILED DESCRIPTION OF EMBODIMENTS

In order to make the invention more concrete, embodiments are described in detail below with reference to the accompanying drawings. It should be understood that the invention is not limited to these examples.

Figure 1:
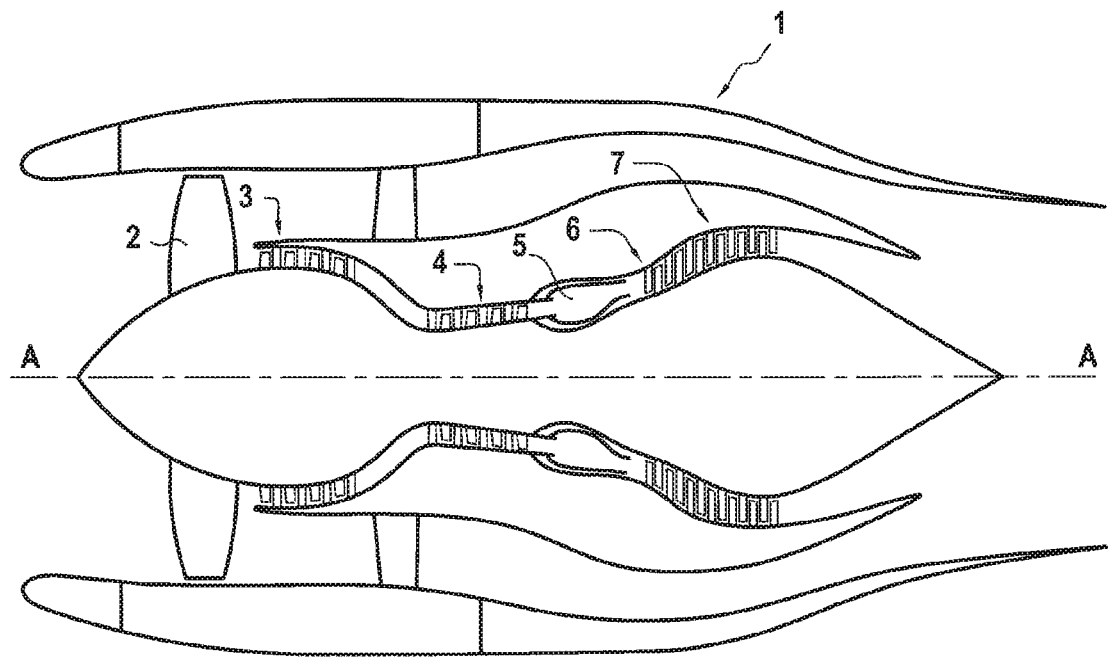
FIG. 1 is a view in axial section of a turbine engine of the invention.

FIG. 1 is a section view on a vertical plane containing the main axis A of a bypass turbojet 1 of the invention. From upstream to downstream in the flow direction of the air stream, it comprises a fan 2, a low pressure compressor 3, a high pressure compressor 4, a combustion chamber 5, a high pressure turbine 6, and a low pressure turbine 7.

Figure 2:
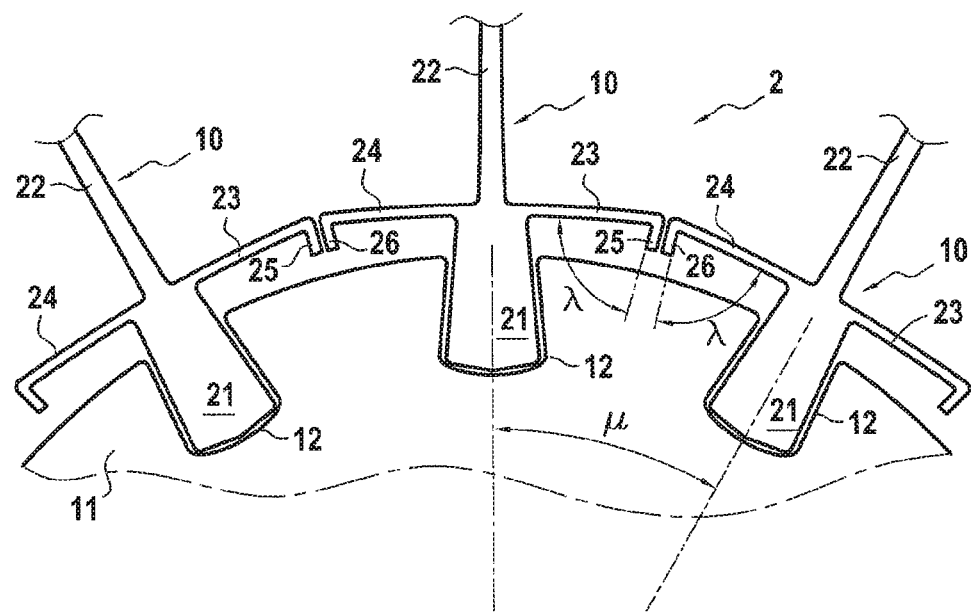
FIG. 2 is a fragmentary diagram in radial section of a rotor wheel of the invention.

As shown in FIG. 2, the fan 2 has a plurality of fan blades 10 mounted angularly around the axis A on a disk 11 that is connected to the low pressure shaft of the turbine engine 1.

Figure 3:
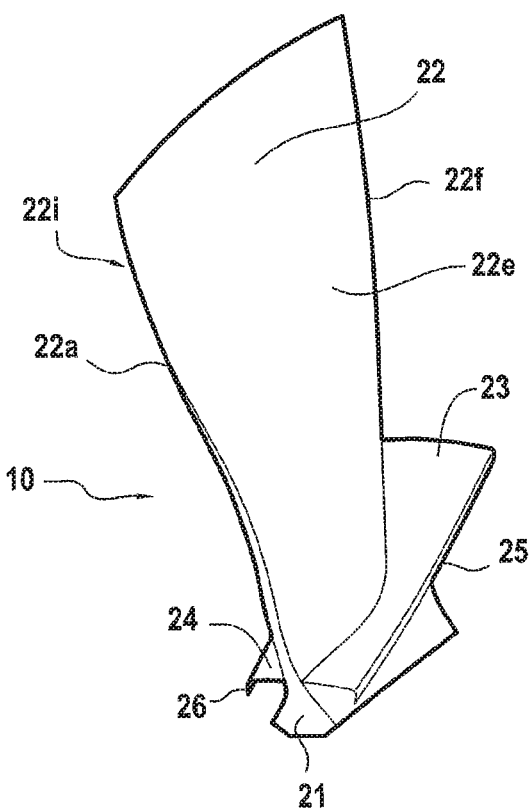
FIG. 3 is a perspective view of a blade in one embodiment.

Such a fan blade is shown in FIG. 3. It has a blade root 21 of dovetail shape configured to engage in a slot 12 in the disk 11 in order to fasten it to the disk 11. The blade root 21 is extended outwards by an airfoil 22 presenting a suction side face 22e and a pressure side face 22i, each extending from upstream to downstream between a leading edge 22a and a trailing edge 22f.

The blade 10 also has a suction side platform 23 extending transversely between the suction side of the blade from the junction between the blade root 21 and the airfoil 22, and a pressure side platform 24 extending transversely beside the pressure side of the blade from the junction between the blade root 21 and the airfoil 22.

In accordance with the invention, each platform 23, 24 is also provided with a stiffener 25, 26. As can be seen more clearly in FIGS. 4 and 5, each of these stiffeners is in the form of a flange constituted by a strip or a rim extending radially all along the distal edge of the corresponding platform 23, 24; more precisely, each stiffener 25, 26 extends inwards from the distal edge of its platform 23, 24, i.e. it extends downwards in the reference frame of the blade, forming an angle λ relative to the platform 23, 24; a rounded connection may be provided between the stiffener 25, 26 and the platform 23, 24.

As shown in FIG. 2, this angle λ is substantially equal to half the angular difference μ between two blades 10 within the rotor wheel 2. By way of example, if the wheel 2 has one blade 10 every 20°, then the stiffeners 25, 26 form an angle λ of 10° relative to the platforms 23, 24. In this way, when the blades 10 are mounted on the disk 11 of the rotor wheel 2, the suction side and pressure side platforms 23 and 24 of each consecutive pair of blades follow one another in continuous manner and their stiffeners 25 and 26 bear against each other, ignoring operating clearance, over all or practically all of their surface areas.

Figure 4:
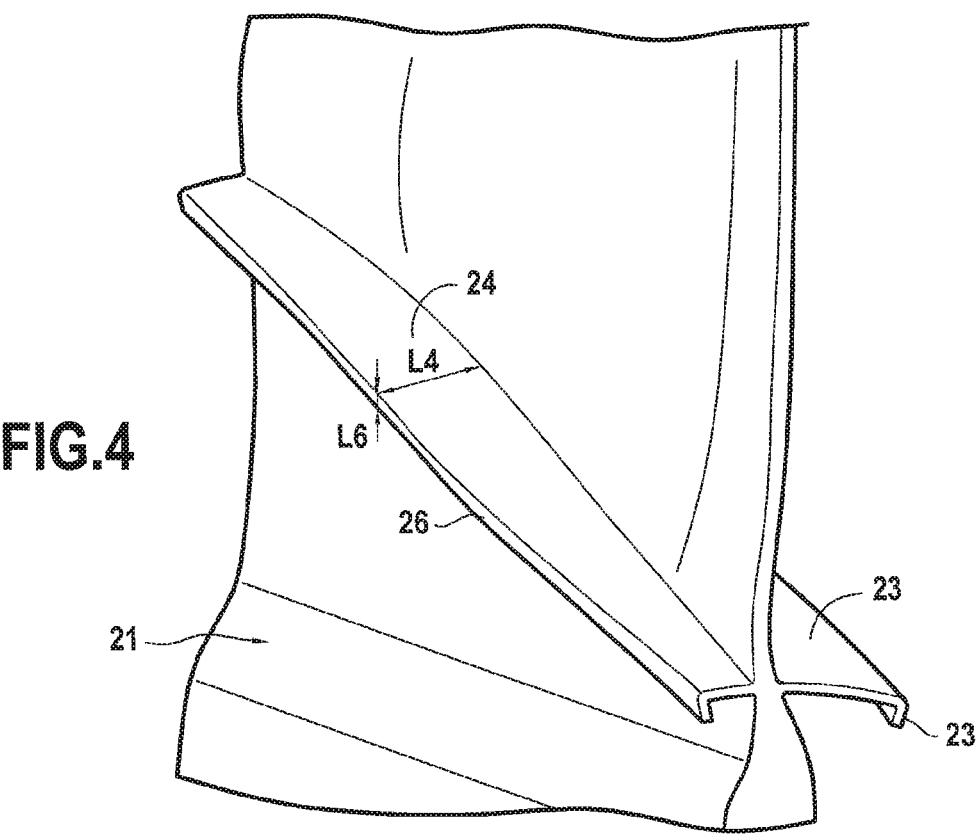
FIG. 4 is a fragmentary view of the pressure side of the FIG. 3 blade.
Figure 5:
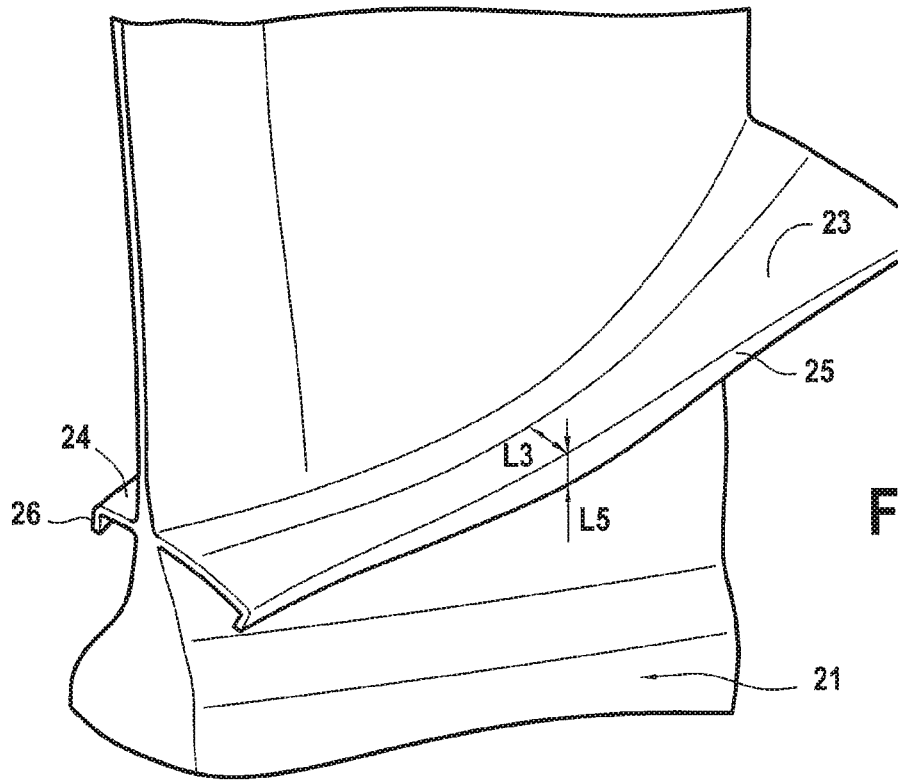
FIG. 5 is a fragmentary view of the suction side of the FIG. 3 blade.

Furthermore, as can be seen in FIGS. 4 and 5, the width L5 and L6 of each of the stiffeners 25, 26 varies along its platform 23, 24 as a function of the width L3, L4 of the platform. More precisely, in a given longitudinal plane, the wider the platform 23, 24, the narrower its stiffener 25, 26. Still more precisely, the width of a given stiffener 25, 26 varies along the distal edge of the corresponding platform 23, 24 in a manner that is inversely proportional to the width of the platform 23, 24.

As can be seen in FIG. 4, because of the concave curvature of the suction side face of the blade 10, the suction side platform 24 possesses a width L4 that, going from upstream to downstream, increases up to a substantially middle zone of the airfoil 22 and then decreases down to the trailing edge 22f: under such circumstances, the width L6 of the stiffener 26 decreases from its upstream edge to that middle zone, and then increases once more going to its downstream end.

Conversely, as can be seen in FIG. 5, because of the convex curvature of the suction side face of the blade 10, the suction side platform 23 possesses a width L3 that, going from upstream to downstream, decreases to a substantially middle zone of the airfoil 22 and then increases to the trailing edge 22f: under such circumstances, the width L5 of the stiffener 25 increases from its upstream end as far as that middle zone, and then decreases once more to its downstream end where, given the great width of the suction side platform 23, it becomes zero or practically zero.

In this example, the blade 10 is obtained as a single piece by three-dimensional weaving of a fiber preform 30, and by injecting an organic resin using the resin transfer molding (RTM) method known to the person skilled in the art.

Figure 6:
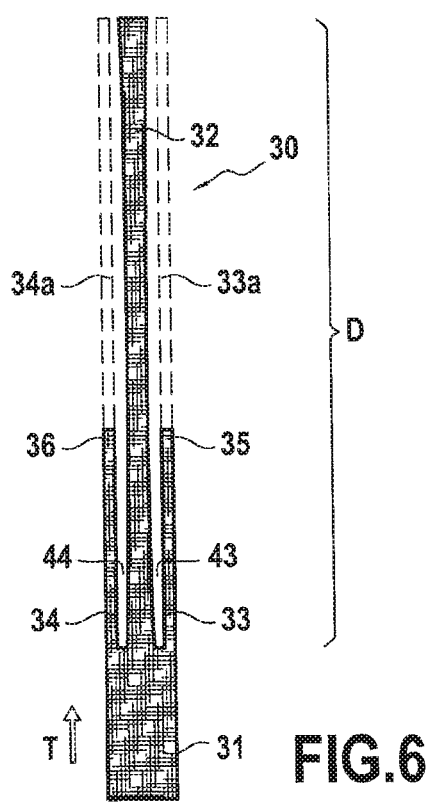
FIG. 6 is a diagram showing the preform corresponding to this embodiment of a blade prior to being shaped.
Figure 7:
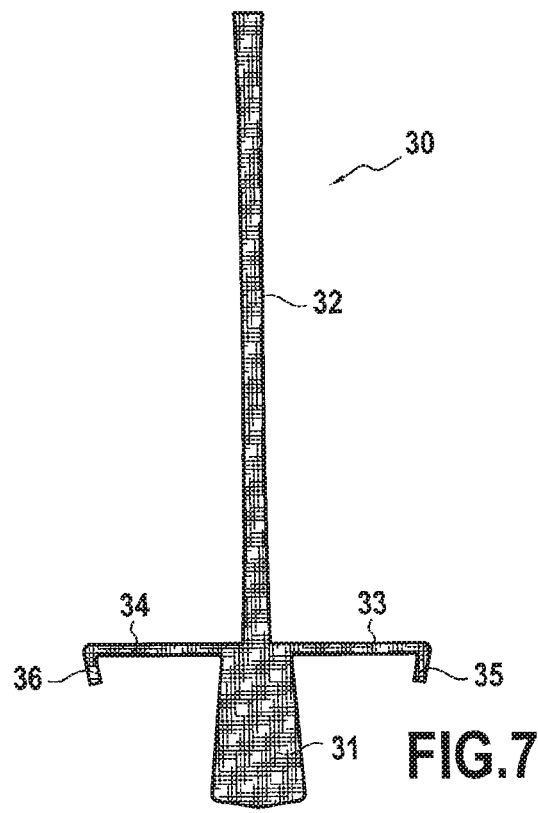
FIG. 7 is a diagram showing the preform corresponding to this embodiment of a blade after it has been shaped.

FIG. 6 shows this three-dimensionally woven preform 30 suitable for making this embodiment of a blade 10. FIG. 7 shows the same preform 30 after it has been shaped. The preform 30 is described from bottom to top, i.e. from upstream to downstream in the weaving direction T. Nevertheless, it should be understood that weaving could be performed starting from the other end and going in the opposite direction.

In this embodiment, the preform 30 is three-dimensionally woven out of carbon fibers using a 3D interlock weave. Only the surfaces of the preform 30 are woven two-dimensionally using a satin type weave.

At the bottom end, the weaving begins by making a first longitudinal segment 31 that is to form the root 21 of the blade 10.

Above this first longitudinal section 31, there begins a zone of non-interlinking D in which a first free flap 33a, a second longitudinal segment 32, and a second free flap 34a are woven jointly in non-interlinked manner with respective non-interlinking planes 43 and 44. Weaving methods that make such non-interlinking possible are now well known in the field of 3D weaving.

Layer exits may also be formed along the weaving direction T between the second longitudinal segment 32 and each of the free flaps 34a, 34b in order to refine the second longitudinal segment 32 and thus the future airfoil 22. Weaving methods that enable such layer exits to be provided are nowadays well known in the field of 3D weaving.

Once the weaving has been finished, the free flaps 33a and 34a are cut to size so that the first flap forms a first transverse segment 33 that is to form the suction side platform 23 of the blade 10 and a first stiffener strip 35 that is to form the suction side stiffener 25, and the second flap forms a second transverse segment 34 that is to form the pressure side platform 24 of the blade 10 and the second stiffener strip 36 that is to form the pressure side stiffener 26.

It should be observed at this point that the terms "transverse" and "longitudinal" are given relative to the final position of the segment under consideration, the transverse segments being necessarily woven longitudinally before being folded transversely.

Once the free flaps 33a and 34a have been cut to size, the floating yarns that result from the layer exits located in the surface of the second longitudinal segment 32 are accessible and can be shaved off.

The preform 30 may be moistened in order to make it more flexible and in order to make it easier to move the fibers out of register. The preform is then placed in a shaping mold with inside space that matches the shape desired for the preform 30.

The preform 30 is then dried so that it becomes stiff, thus blocking the shape imposed during shaping. Finally, the preform 30 is placed in an injection mold having the dimensions desired for the final blade 10, and a matrix is injected into that mold, specifically an epoxy resin is injected. Such injection may be performed using the known RTM method, for example.

At the end of this step, a blade 10 is obtained that is made of composite material comprising a preform 30 woven out of carbon fibers embedded in an epoxy matrix. Machining steps may optionally be used to finish off the method and obtain the final blade 10.

Naturally, the weaving example described above is merely one example amongst many other possibilities that the person skilled in the art will recognize easily. In particular, it is possible to imagine other zones of non-interlinking or to use other weaving techniques such as crossed layers, layer exits, or thickness transitions in order to obtain a preform of analogous shape. The person skilled in the art will in particular find numerous examples of weaving in Document WO 2014/076408.

The embodiments described in the present description are given by way of non-limiting illustration, and in the light of this description, a person skilled in the art can easily modify these embodiments, or can envisage others, while remaining within the scope of the invention.

Furthermore, the various characteristics of these embodiments can be used singly or in combination with one another. When they are combined, these characteristics may be combined as described above or in other ways, the invention not being limited to the specific combinations described in the present description. In particular, unless specified to the contrary, a characteristic described with reference to one particular embodiment may be applied in analogous manner to some other embodiment.

The invention claimed is:

1. A fiber preform for a turbine engine blade obtained by three-dimensional weaving, the preform comprising:
   a first longitudinal segment suitable for forming a blade root extending from a first end of the preform toward a second end of the preform;
   a second longitudinal segment extending from the first longitudinal segment in an upward direction away from the first end of the preform to the second end of the preform and suitable for forming an airfoil portion;
   a first transverse segment extending transversely from the junction between the first and second longitudinal segments and suitable for forming a first platform; and
   a first stiffener strip extending from a distal edge of the first transverse segment in a downward direction opposite to the upward direction, the first stiffener strip being suitable for forming a first platform stiffener;
   wherein the first stiffener strip extends along an entirety of the distal edge of the first transverse segment.

2. A preform according to claim 1, wherein the first stiffener strip is of varying width extending along an axial direction of the preform, as measured in the downward direction, wherein the axial direction is perpendicular to the downward direction.

3. A preform according to claim 1, wherein the first stiffener strip is of minimum width, as measured in the downward direction, at a position where the width of the first transverse segment is at a maximum, as measured in a direction transverse to the downward direction; and
   the first stiffener strip is of a maximum width where the width of the first transverse segment is at a minimum width.

4. A preform according to claim 1, wherein, along an axial direction of the preform that is perpendicular to the downward direction, the width of the first stiffener strip increases in the downward direction when the width of the first transverse segment, as measured in a direction transverse to the downward direction, decreases, and along the axial direction, the width of the first stiffener strip decreases, as measured in the downward direction, when the width of the first transverse segment increases, as measured in the direction transverse to the downward direction.

5. A preform according to claim 4, wherein the width of the first stiffener strip in a given longitudinal plane, as measured in the downward direction, is inversely proportional to the width of the first transverse segment, as measured in the direction transverse to the downward direction, in said longitudinal plane.

6. A preform according to claim 1, wherein the first stiffener strip forms an angle with the first transverse segment, the angle lying in the range 60° to 89°.

7. A preform according to claim 1, including a second transverse segment extending transversely from the junction between the first and second longitudinal segments in line with and away from the first transverse segment, and suitable for forming a second platform, and
 a second stiffener strip extending in the downward direction from a distal edge of the second transverse segment, suitable for forming a second platform stiffener.

8. A preform according to claim 7, wherein the first transverse segment is suitable for forming a suction side platform of the blade and the second transverse segment is suitable for forming a pressure side platform of the blade;
 wherein the first stiffener strip suitable for forming the stiffener of the suction side platform is of width, as measured in the downward direction, that is greater in its middle zone than at its upstream and downstream ends; and
 wherein the second stiffener strip suitable for forming the stiffener of the pressure side platform is of width, as measured in the downward direction, that is smaller in its middle zone than at its upstream and downstream ends.

9. A turbine engine blade comprising:
 a blade root extending from a first end of the turbine engine blade toward a second end of the turbine engine blade;
 an air foil portion extending from the blade root in an upward direction away from the first end of the turbine engine blade toward the second end of the turbine engine blade;
 a platform extending transversely from the airfoil at a junction between the blade root and the airfoil portion; and
 a stiffener in the form of a strip extending in a downward direction opposite to the upward direction along a distal edge of the platform, wherein the blade is made as a single piece out of composite material by means of a fiber preform according to claim 1, said preform having been shaped in a mold and embedded in a matrix.

10. A blade wheel for a turbine engine including a plurality of blades according to claim 9.

11. A turbine engine including at least one blade according to claim 9.

12. A turbine engine including at least one bladed wheel according to claim 10.

13. A preform according to claim 1, wherein the first stiffener strip forms an angle with the first transverse segment, the angle lying in the range 75° to 85°.

14. A turbine engine blade according to claim 9, wherein the matrix is a matrix of organic type.

15. A turbine engine blade comprising:
 a blade root extending from a first end of the turbine engine blade toward a second end of the turbine engine blade; and
 an airfoil portion extending upwards from the blade root in an upward direction away from the first end of the turbine engine blade toward the second end of the turbine engine blade;
 a platform extending transversely from the airfoil at a junction between the blade root and the airfoil portion; and
 a stiffener in the form of a strip extending in a downward direction opposite to the upward direction along a distal edge of the platform;
 wherein the stiffener extends along an entirety of the distal edge of the platform.

* * * * *